(12) United States Patent
Rowan et al.

(10) Patent No.: US 11,788,476 B1
(45) Date of Patent: Oct. 17, 2023

(54) FLUID SYSTEM WITH VARIABLE PUMP DISCHARGE PRESSURE AND METHOD

(71) Applicant: HONEYWELL INTERNATIONAL INC., Charlotte, NC (US)

(72) Inventors: William Scott Rowan, South Bend, IN (US); Larry Portolese, South Bend, IN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/804,926

(22) Filed: Jun. 1, 2022

(51) Int. Cl.
| F02C 9/30 | (2006.01) |
| F02C 9/26 | (2006.01) |
| F02C 7/232 | (2006.01) |
| F02C 9/28 | (2006.01) |

(52) U.S. Cl.
CPC ............... *F02C 9/30* (2013.01); *F02C 7/232* (2013.01); *F02C 9/263* (2013.01); *F02C 9/28* (2013.01); *F05D 2260/60* (2013.01); *F05D 2270/3011* (2013.01); *F05D 2270/3013* (2013.01)

(58) Field of Classification Search
CPC .. F02C 7/232; F02C 9/263; F02C 9/30; F04B 19/22; F04B 49/08; F23K 5/147; F02M 37/0023; F04D 15/0022
See application file for complete search history.

(56) References Cited

U.S. PATENT DOCUMENTS

| 5,715,674 | A | 2/1998 | Reuter et al. |
| 6,102,001 | A | 8/2000 | Mclevige |
| 6,751,942 | B2 | 6/2004 | Mahoney et al. |
| 6,962,485 | B2 | 11/2005 | Bennett et al. |
| 7,431,015 | B2* | 10/2008 | Mahoney ................ F23K 5/147 |
| | | | 60/39.01 |
| 7,690,355 | B2 | 4/2010 | Emo et al. |
| 7,878,003 | B1* | 2/2011 | Smith ..................... F02C 7/224 |
| | | | 60/764 |
| 7,966,995 | B2 | 6/2011 | Futa, Jr. et al. |
| 8,348,630 | B2 | 1/2013 | Tysver et al. |
| 9,353,688 | B2* | 5/2016 | Futa ........................ F02C 7/22 |

(Continued)

FOREIGN PATENT DOCUMENTS

| DE | 102013109419 A1 | 3/2014 |
| JP | 5078226 B2 | 11/2012 |

*Primary Examiner* — Alain Chau
(74) *Attorney, Agent, or Firm* — Lorenz & Kopf LLP

(57) ABSTRACT

Methods and fluid supply systems are provided for supplying fluids while adjusting a pump discharge pressure to compensate for downstream pressure changes. The fluid supply system comprises a variable displacement piston (VDP) pump configured to supply a fluid at a pump discharge pressure, fuel metering units (FMUs) downstream of the VDP pump, each of the FMUs configured to receive the fluid from the VDP pump at the pump discharge pressure and supply the fluid at metered flow discharge pressures, and a pump compensator valve fluidically coupled with the FMUs to receive the fluid therefrom at the metered flow discharge pressures and configured to continuously, either fluidically or mechanically, adjust the pump discharge pressure of the VDP pump between a higher of a minimum pump discharge pressure and a floating ceiling pump discharge pressure, the floating ceiling pump discharge pressure based on a highest of the metered flow discharge pressures.

16 Claims, 5 Drawing Sheets

(56) References Cited

U.S. PATENT DOCUMENTS

| | | | |
|---|---|---|---|
| 9,574,500 B2 | 2/2017 | Kelly et al. | |
| 10,041,497 B2 * | 8/2018 | Nyzen | F02C 7/236 |
| 10,451,053 B2 * | 10/2019 | Nyzen | F04B 49/08 |
| 2002/0066266 A1 | 6/2002 | Maker et al. | |
| 2005/0100447 A1 | 5/2005 | Desai et al. | |
| 2007/0175449 A1 * | 8/2007 | Mahoney | F23K 5/147 |
| | | | 123/454 |
| 2008/0163931 A1 * | 7/2008 | Brocard | F02C 9/28 |
| | | | 137/10 |
| 2009/0031821 A1 | 2/2009 | Rowan et al. | |
| 2014/0196459 A1 * | 7/2014 | Futa | F02C 7/22 |
| | | | 60/734 |
| 2015/0075634 A1 | 3/2015 | Nyzen et al. | |
| 2015/0125313 A1 * | 5/2015 | Nyzen | F04B 23/14 |
| | | | 417/253 |
| 2015/0192075 A1 * | 7/2015 | Griffiths | F02C 7/26 |
| | | | 60/39.281 |
| 2017/0306856 A1 * | 10/2017 | Bickley | F02C 7/236 |

\* cited by examiner

FLUID SYSTEM WITH VARIABLE PUMP DISCHARGE PRESSURE AND METHOD

TECHNICAL FIELD

The present invention generally relates to fluid supply systems, and more particularly relates to a fluid system and method for supplying fuel in a manner that adjusts pump discharge pressure to compensate for downstream pressure changes.

BACKGROUND

Typical gas turbine engine fuel supply systems include a fuel source, such as a fuel tank, and one or more pumps that draw fuel from the fuel source and deliver pressurized fuel to fuel manifolds and fuel nozzles in an engine combustor via a main supply line. The main supply line may include one or more valves in flow series between the pumps and the fuel manifolds. These valves generally include one or more valves associated with a fuel metering unit and a shutoff/overspeed valve downstream of the fuel metering unit. In some systems, three pumps are used to deliver pressurized fuel. These pumps may include an aircraft or tank level pump, a boost pump, and a high-pressure pump. The boost pump is typically a centrifugal pump, and the high-pressure pump is typically a gear pump (e.g., a variable displacement piston pump), though in some applications the high-pressure pump may also be a centrifugal pump.

In many fuel supply systems, the high-pressure pump is sized to have provide excess flow to maintain a sufficient pressure drop across the fuel metering unit. If the high-pressure pump is a gear pump, then the fuel supply system typically includes some type of bypass subsystem maintain the pressure drop across the fuel metering unit and to recirculate excess flow back to the inlet of the high-pressure pump. This flow recirculation increases the temperature of the fuel, and this waste heat may exceed the capacity for the fuel. It is thus becoming increasingly desirable to minimize the self-heating of the fuel system.

Hence, there is a need for a gas turbine engine fuel supply system that includes that minimizes the self-heating of the fuel, and thereby provides a thermodynamically efficient architecture.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A fluid supply system is provided. The fluid supply system comprises a variable displacement piston pump configured to supply a fluid at a pump discharge pressure, one or more fuel metering units downstream of the variable displacement piston pump, each of the one or more fuel metering units configured to receive the fluid from the variable displacement piston pump at the pump discharge pressure and supply the fluid at metered flow discharge pressures, and a pump compensator valve fluidically coupled with the one or more fuel metering units to receive the fluid therefrom at the metered flow discharge pressures and configured to continuously, either fluidically or mechanically, adjust the pump discharge pressure of the variable displacement piston pump between a higher of a minimum pump discharge pressure and a floating ceiling pump discharge pressure, the floating ceiling pump discharge pressure based on a highest of the metered flow discharge pressures.

A method is provided. The method comprises supplying a fluid at a pump discharge pressure with a variable displacement piston pump, receiving the fluid from the variable displacement piston pump at the pump discharge pressure by one or more fuel metering units downstream of the variable displacement piston pump, supplying the fluid at metered flow discharge pressures with the one or more fuel metering units, receiving a highest of the metered flow discharge pressures with a pump compensator valve fluidically coupled with the one or more fuel metering units, and continuously, either fluidically or mechanically, adjusting the pump discharge pressure of the variable displacement piston pump with the pump compensator valve between a higher of a minimum pump discharge pressure and a floating ceiling pump discharge pressure, the floating ceiling pump discharge pressure based on the highest of the metered flow discharge pressures.

Furthermore, other desirable features and characteristics of the fluid supply system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description. In this regard, although an embodiment of the invention is described as being implemented in an aircraft, it will be appreciated that the invention may be implemented in numerous and varied end-use environments where fuel flow to a gas turbine engine is controlled. Moreover, the invention is not limited to use as a fuel supply system, but may be used in numerous systems to deliver a meter flow of fluid to one or more loads.

Figure 1:
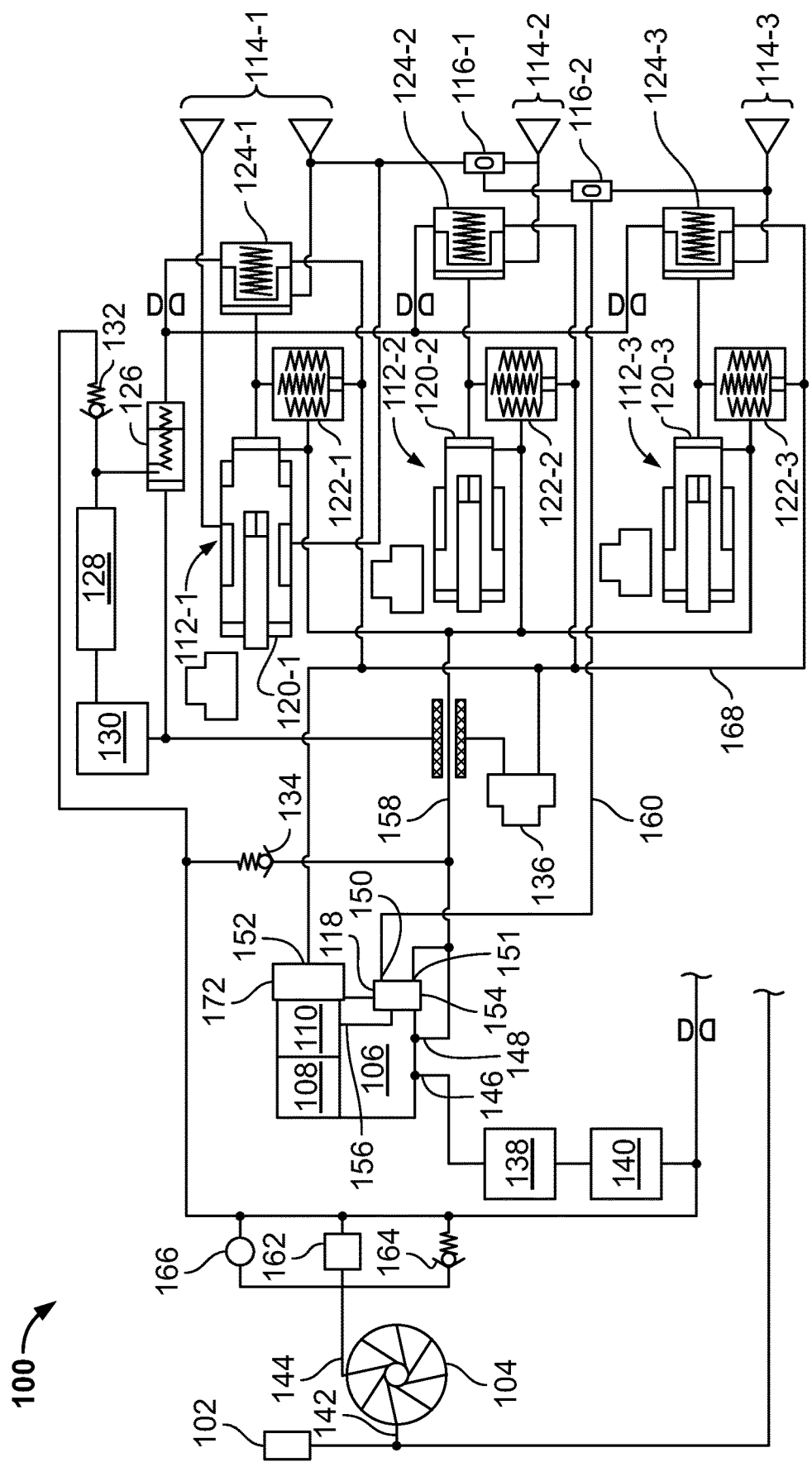
FIG. 1 schematically represents a first exemplary embodiment of a fuel supply system in accordance with an exemplary embodiment.

Referring initially to FIG. 1, a simplified schematic diagram of one embodiment of a fuel supply system 100 for a gas turbine engine, such as a turbofan jet aircraft engine, is presented. The system 100 includes a fuel source 102, a boost pump 104, a variable displacement piston (VDP) pump 106, fuel metering units (FMUs) 112 (e.g., 112-1, 112-2, 112-3), and a pump compensator valve 118. The fuel source 102 (e.g., one or more tanks) stores fuel to be supplied to a plurality of fuel loads 114 (e.g., 114-1, 114-2, 114-3). It will be appreciated that the number and type of fuel loads may vary and may include various systems and components. In this example, the three independent fuel loads 114 include a pilot primary zone 114-1, a pilot secondary zone 114-2, and a main flow zone 114-3.

A supply line 158 coupled to the fuel source 102 and, via the boost pump 104 and the VDP pump 106, delivers the fuel to the fuel loads 114. It is noted that the supply line 158 is, for convenience, depicted and described with a single reference numeral. However, it will be appreciated that the system 100 may be implemented using separate sections of piping.

The boost pump 104 and the VDP pump 106 are engine-driven pumps positioned in flow-series in the supply line 158 and take a suction on the fuel source 102. The boost pump 104 may be, for example, a relatively low horsepower centrifugal pump. The boost pump 104 takes a suction directly on the fuel source 102 and provides sufficient suction head for the VDP pump 106. The VDP pump 106 may then supply the fuel at a relatively high pressure to the remainder of the supply line 158. Although not depicted, it will be appreciated that the system 100 may additionally include a low-pressure pump with the fuel source 102 to supply the fuel to the boost pump 104.

The VDP pump 106 includes an adjustable hanger 108 (i.e., a swash plate) and a hanger actuator 110. As is generally known, a variable displacement piston pump can be adjusted to increase or decrease the amount of fuel supplied thereby. More specifically, the adjustable hanger 108 is coupled to a plurality of pistons (not shown) that are each disposed in a plurality of corresponding cylinders (not shown). The stroke of the pistons in the cylinders, and thus the flow rate of the VDP pump 106, is varied by varying the position of the adjustable hanger 108. The position of the adjustable hanger 108 is varied by the hanger actuator 110. The hanger actuator 110 includes a pump control pressure inlet port 156 that is in fluid communication with, and thus receives pump control fluid from, the pump compensator valve 118. The hanger actuator 110 is responsive to fluid pressure variations of the pump control fluid to move the adjustable hanger 108.

In the example presented in FIG. 1, each fuel metering unit 112 includes a metering valve 120 (120-1, 120-2, 120-3), a throttle valve 124 (124-1, 124-2, 124-3), and a head sensor 122 (122-1, 122-2, 122-3). The metering valves 120 are each implemented using an electro-hydraulic servo valve (EHSV) positioning the corresponding metering valve 120 with position feedback provided by a linear variable differential transformer (LVDT). The throttle valves 124 are each configured to maintain an associated metering head pressure. The head sensors 122 are each configured to sense and null out on metering head pressure by modulating a spring side pressure reference of an associated throttling valve 124.

The system 100 includes a head sensor regulator 126 and a shut-off/overspeed EHSV 136. The head sensor regulator 126 is configured to establish a consistent return pressure for each of the throttle valve 124/head sensor 122 loops of the fuel metering units 112. The shut-off/overspeed EHSV 136 is configured, when commanded, to port high pressure fluid to a spring side of each of the throttle valves 124 to implement positive shutdown. The system 100 may include one or more actuation loops 128 capable of controlling one or more corresponding movable components, such as one or more components a gas turbine engine or an aircraft comprising the same. The one or more actuation loops 128 may be in fluid communication with a servo fuel/oil heat exchanger 130 and/or a servo relief valve 134.

The pump compensator valve 118 is in fluid communication with the hanger actuator 110 and, as previously noted, supplies the pump control fluid to the hanger actuator 110. The pump compensator valve 118 includes at least a pump control pressure outlet port 154, a supply line pressure inlet port 151, and a select high line pressure inlet port 150. The pump control pressure outlet port 154 is in fluid communication with, and supplies the pump control fluid to, the hanger actuator 110 via the pump control pressure inlet port 156.

In certain examples, the system 100 may be configured to operate in a normal mode and a shutdown mode. In such examples, the VDP pump 106 may be in fluid communication with a mode control valve 172 that includes a mode control pressure port 152. The mode control pressure port 152 is coupled to the shut-off/overspeed EHSV 136, and each of the throttle valve 124/head sensor 122 loops. As such, the mode control pressure port 152 is configured to receive a high-pressure fluid when the shut-off/overspeed EHSV 136 is commanded to implement positive shutdown. As such, the VDP pump 106 is configured to be responsive to fluid pressure at the mode control pressure port 152 to operate in either a normal mode or a shutdown mode.

In the shutdown mode, the mode control valve 172 may control the fluid pressure of the pump control fluid supplied to the hanger actuator 110 such that the VDP pump 106 is controlled in accordance with a variable flow/constant discharge pressure scheme. In general, the mode control valve 172 is placed in the shutdown mode when the configuration of the system 100 is such that the VDP pump 106 only needs to supply an amount of flow sufficient to make up for internal losses and, if needed or desired, to maintain sufficient pressure to supply fuel to one or more of the fuel loads 114.

In the normal mode, the pump compensator valve 118 controls the fluid pressure of the pump control fluid supplied to the hanger actuator 110 such that the VDP pump 106 supplies fuel at a rate sufficient to maintain a constant differential pressure across the fuel metering units 112. It is generally known that engine nozzle backpressure varies as a function of the metered flow rate through the fuel metering units 112 to the combustor. Hence, to maintain the differential pressure across the fuel metering units 112, the discharge pressure of the VDP pump 106 also varies as a function of metered flow. It may thus be appreciated that the pump compensator valve 118, in the normal mode, controls the fluid pressure of the pump control fluid supplied to the hanger actuator 110 such that the VDP pump 106 is controlled in accordance with a variable flow/variable discharge pressure scheme.

The select high line pressure inlet port 150 of the pump compensator valve 118 is coupled to a select high line 160. The pump compensator valve 118 is configured to regulate the fuel pressure in the supply line 158 between a higher of a minimum pump discharge pressure and a floating ceiling pump discharge pressure. The minimum pump discharge pressure may be a predetermined differential pressure above a reference pressure (R1). In this example, the minimum pump discharge pressure is a predetermined differential pressure above a boost pump discharge pressure supplied to the VDP pump 106 by the boost pump 104 from the boost pump outlet 144.

The floating ceiling pump discharge pressure may be a varying pressure based on a current highest load pressure downstream from the VDP pump 106. In the example of FIG. 1, the floating ceiling pump discharge pressure is a current highest metered flow pressure amongst all the fuel metering units 112. That is, the floating ceiling pump discharge pressure may be a predetermined differential pressure above the highest of the pressures of the fuel metering units 112. Since the metered flow pressure of the fuel metering units 112 varies, the floating ceiling pump pressure varies during the normal mode. The highest metered flow pressure amongst the fuel metering units 112 is supplied to the select high line 160 via a plurality of select high valves 116 (e.g., 116-1, 116-2, 116-3) that are each located downstream of a corresponding one of the fuel metering units 112.

Figure 2:
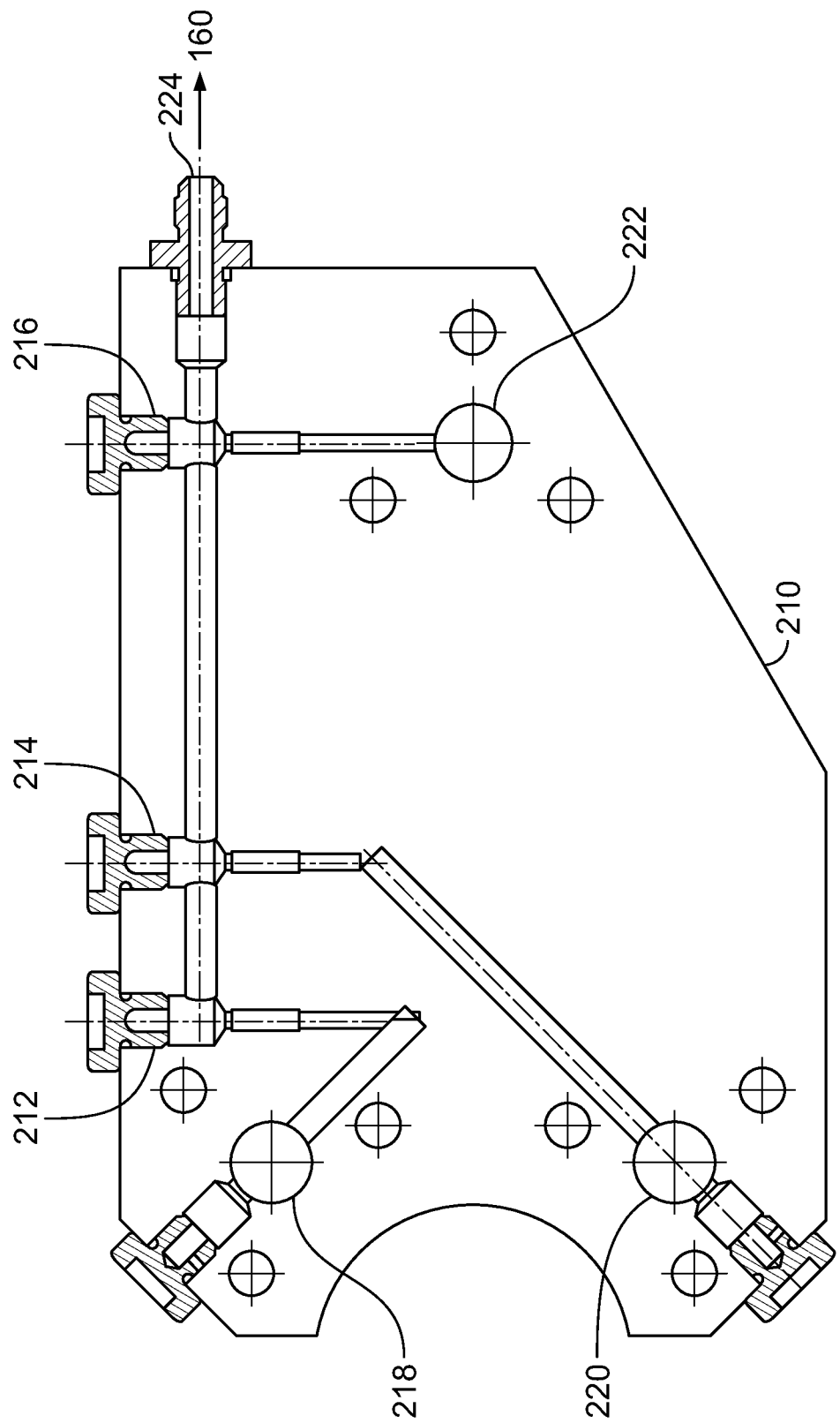
FIG. 2 is a schematic diagram of an exemplary check valve assembly in accordance with an exemplary embodiment.

In some examples, the select high valves 116 may be, for example, cascaded, two-position toggle valves positioned in flow-series in the select high line 160, as represented in FIG. 1. In other examples, the select high valves 116 may be one or more check valves positioned in flow-parallel in the select high line 160. For example, FIG. 2 represents a schematic diagram of a check valve assembly 210 that includes a first check valve 212, a second check valve 214, and a third check valve 216 that are each fluidically coupled with a corresponding one of the fuel metering units 112. The metered flow pressures of the fuel metering units 112 are provided to check valve inlets 218, 220, and 222, and the highest metered flow pressure amongst the fuel metering units 112 is supplied through the check valve assembly 210 from an outlet 224 to the select high line pressure inlet port 150 of the pump compensator valve 118.

Figure 3:
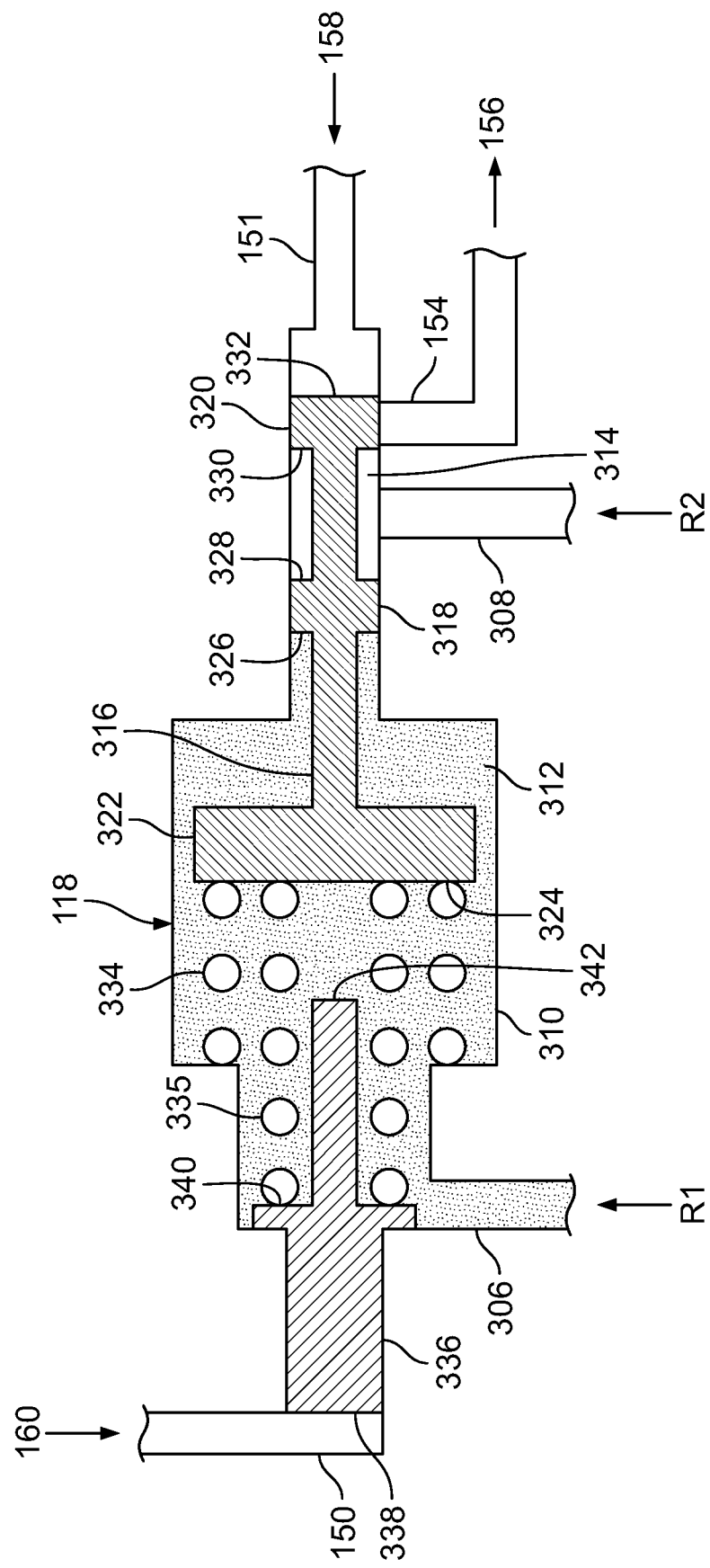
FIG. 3 is a schematic diagram of an exemplary pump compensator valve in accordance with an exemplary embodiment.
Figure 4:
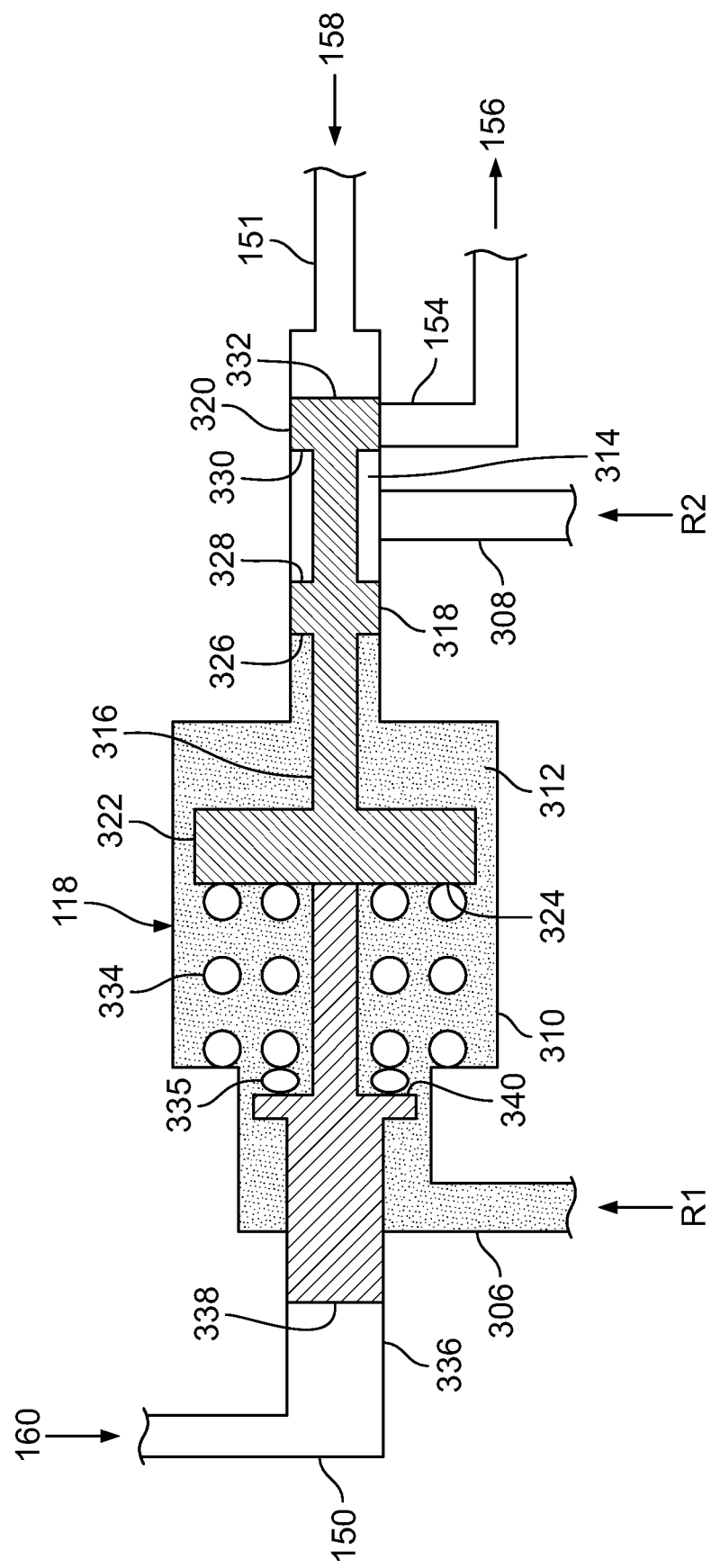
FIG. 4 is a schematic diagram of the pump compensator valve of FIG. 3 in a floating ceiling configuration.

FIGS. 3 and 4 present cross-sectional views of an exemplary construction of the pump compensator valve 118. In this example, the pump compensator valve 118 includes a valve body 310 that includes a first reference pressure port 306 and a second reference pressure port 308, in addition to the select high line pressure inlet port 150, the supply line pressure inlet port 151, and the pump control pressure outlet port 154. The first reference pressure port 306 provides fluidic communication between the first reference pressure R1 (e.g., the VDP pump inlet 146) and a first chamber 312 of the valve body 310, and the second reference pressure port 308 provides fluidic communication between a second reference pressure (R2) and a second chamber 314 of the valve body 310. The second reference pressure R2 may be a low-pressure fluid (e.g., case pressure).

A first valve element 316 (e.g., spool) is movably disposed within the valve body 310 and includes a first land 318 and a second land 320. The first land 318 includes a first side 326 exposed to fluid pressure within the first chamber 312 and a second side 328 exposed to fluid pressure within the second chamber 314. The second land 320 includes a first side 330 exposed to fluid pressure within the second chamber 314 and a second side 332 exposed to fluid pressure from the supply line pressure inlet port 151. The first valve element 316 further includes a valve end 322 disposed within the first chamber 312 and having a spring side 324 engaged with a first valve spring 334. The first valve spring 334 is disposed within the first chamber 312 and provides a biasing force against the first valve element 316 in a direction toward the supply line pressure inlet port 151. A second valve element 336 is movably disposed within the valve body 310 and includes a first side 338 exposed to fluid pressure from the select high line pressure inlet port 150 and a second side 340 engaged with a second valve spring 335 opposite the valve end 322 and exposed to the fluid pressure from the first chamber 312. The second valve element 336 and the first valve element 316 are axially aligned. The second valve element 336 includes a distal end 342 protruding from the second side 340 through a gap in the first valve spring 334 and the second valve spring 335.

With this arrangement, the pump compensator valve 118 is responsive to the biasing forces of the first valve spring 334, the second valve spring 335, the fluid pressure of the first chamber 312, the fluid pressure of the select high line pressure inlet port 150, and the fluid pressure of the supply line pressure inlet port 151 to adjust the pump discharge pressure of the VDP pump 106 between the minimum pump discharge pressure and the floating ceiling pump discharge pressure while operating in normal mode. As such, the relative positioning of the first valve element 316 and the second valve element 336, and therefore the operation of the VDP pump 106, is based on a balance of these forces.

If the fluid pressure in the select high line 160 is below the combination of the fluid pressure of the first chamber 312 (i.e., R1) and the second valve spring 335 at a maximum compression thereof, operation of the VDP pump 106 is based on a balance of the fluid pressure of the supply line pressure inlet port 151 and the combination of the first valve spring 334 and the fluid pressure of the first chamber 312. Pressure differentials between these competing forces causes movement of the first valve element 316 in response thereto between the select high line pressure inlet port 150 and the supply line pressure inlet port 151. Such movement results in an increase or a decrease in the volume of pump control fluid provided the pump control pressure inlet port 156, which in turn results in a change in fluid flows from the VDP pump 106 to balance these forces and return the first valve element 316 to a neutral position. In this situation, the VDP pump 106 is operating based on the minimum pump discharge pressure.

FIG. 3 represents the pump compensator valve 118 with the first valve element 316 disposed in a neutral position, and the second valve element 336 disposed in a furthest position toward the select high line pressure inlet port 150. The second valve element 336 is in this position when the forces applied to the first side 338 thereof by the fluid pressure at the select high line pressure inlet port 150 is less than the combination of the fluid pressure in the first chamber 312 and the second valve spring 335 at a minimum compression thereof.

If the fluid pressure in the select high line 160 increases relative to the combination of the fluid pressure of the first chamber 312 and the second valve spring 335, the forces applied thereby to the first side 338 of the second valve element 336 may result in the second valve element 336 moving in a direction toward the supply line pressure inlet port 151 by a dimension corresponding to the pressure differential. However, until this movement of the second valve element 236 is sufficient to transverse the gap such that the distal end 342 of the second valve element 336 contacts the spring side 324 of the first valve element 316, the fluid pressure in the select high line pressure inlet port 150 does not affect the operation of the VDP pump 106.

If this movement of the second valve element 236 is sufficient to transverse the gap such that the distal end 342 of the second valve element 336 contacts the spring side 324 of the first valve element 316 (FIG. 4), then the fluid pressure in the select high line pressure inlet port 150 is applied to the first valve element 316. Under these conditions, the operation of the VDP pump 106 is based on a balance of the fluid pressure at the supply line pressure inlet port 151 and the combination of the first valve spring 334, the fluid pressure of the first chamber 312, and the fluid pressure of the select high line pressure inlet port 150. Pressure differentials between these competing forces causes movement of the first valve element 316 in response thereto and thereby affect operation of the VDP pump 106 as previously described to balance these forces and return the first valve element 316 to a neutral position. In this situation, the VDP pump 106 is operating based on the floating ceiling pump discharge pressure.

The system 100 includes a main filter 162, a filter bypass valve 164, and a filter delta pressure indicator 166. The main filter 162 is configured to filter the fuel prior to supplying the fuel to the VDP pump 106. The filter bypass valve 164 is configured to allow the fuel to circumvent the main filter 162, for example, upon a clog in the main filter 162. The filter delta pressure indicator 166 is configured to provide a notification upon bypass of the main filter 162 via the filter bypass valve 164.

The system 100 provides for a method of supplying the fuel from the fuel source 102 to the fuel loads 114 in a manner that adjusts the pump discharge pressure to compensate for downstream pressure changes/demands. The method may include supplying the fuel at the pump discharge pressure with the VDP pump 106, receiving the fuel from the VDP pump 106 at the pump discharge pressure by the fuel metering units 112 downstream of the VDP pump 106, supplying the fuel at the metered flow discharge pressures with the fuel metering units 112, receiving a highest of the metered flow discharge pressures with the pump compensator valve 118 that is fluidically coupled with the fuel metering units 112, and continuously, either fluidically or mechanically, adjusting the pump discharge pressure of the VDP pump 106 with the pump compensator valve 118 between a higher of the minimum pump discharge pressure and the floating ceiling pump discharge pressure. As mentioned previously, the floating ceiling pump discharge pressure may be based on the highest of the metered flow discharge pressures.

In some examples, such as the examples represented in the figures, the fuel supply system 100 may include more than one fuel metering unit 112. In such examples, the method may include receiving the fuel from the VDP pump 106 at the pump discharge pressure by a first of the fuel metering units 112 and a second of the fuel metering units 112, wherein the first fuel metering unit 112 and the second fuel metering unit 112 are in flow-parallel downstream of the VDP pump 106. The method may include providing the metered flow discharge pressure of the first fuel metering unit 112 to a first select high valve 116 downstream from the first fuel metering unit 112 and the metered flow discharge pressure of the second fuel metering unit 112 to a second select high valve 116 downstream from the second fuel metering unit 112, and providing the pump compensator valve 118 with a highest of the metered flow discharge pressures of the first fuel metering unit 112 and the second fuel metering unit 112 with the first select high valve 116 or the second select high valve 116.

The system 100 is described herein as being configured to automatically adjust the pump discharge pressure based on downstream pressures using a fluid-based control system comprising the select high valves 116, the select high line 160, and the pump compensator valve 118. However, it is foreseeable that this fluid-based control system may instead be implemented with an electronics-based control system that includes, for example, various sensors, electronic controllers, transmitters, receivers, electric powered actuators, and various other components. For example, the metered flow discharge pressure may be monitored with pressure sensors, and the highest of the metered flow discharge pressures may be provided to the pump compensator valve 118 as an electrical signal. However, it is believed that the fluid-based control system may provide certain benefits over a comparable electronics-based control system. For example, the fluid-based control system may be more accurate and reliable than the electronics-based control system, in part, due to the capability of compensating for changes in fluid pressure regardless of the source of such changes in fluid pressure. In contrast, the electronics-based control system may be limited to compensating only for changes in fluid pressure that are detected by the pressure sensors.

In some examples, the method may include setting the minimum pump discharge pressure to a predetermined pressure above a supply pressure of the fuel at which the VDP pump 106 receives the fuel (i.e., fluid pressure at the VDP pump inlet 146) and/or setting the floating ceiling pump discharge pressure to a predetermined pressure above the highest of the metered flow discharge pressures that varies as the highest of the metered flow discharge pressures varies.

The method may include adjusting the pump discharge pressure of the VDP pump 106 with the pump compensator valve 118 based on a fluid pressure of an inlet of the VDP pump 106, a fluid pressure of a supply line fluid, and a fluid pressure of the highest of the metered flow discharge pressures.

If the pump compensator valve 118 includes the valve body 310 having the first valve element 316 and the second valve element 336 that are each movable with the valve body 310 along a common axis, and the first valve element 316 engages a first valve spring 334 and the second valve element 336 engages a second valve spring 335, the method may include biasing the first valve element 316 toward the second valve element 336 by a fluid pressure of a supply line fluid and biasing the first valve element 316 away from the second valve element 336 with the first valve spring 334 and a fluid pressure of the VDP pump inlet 146 of the VDP pump 106, biasing the second valve element 336 toward the first valve element 316 by a fluid pressure of the highest of the metered flow discharge pressures and biasing the second valve element 336 away from the first valve element 316 by the fluid pressure of the VDP pump inlet 146 of the VDP pump 106 and the second valve spring 335.

Figure 5:
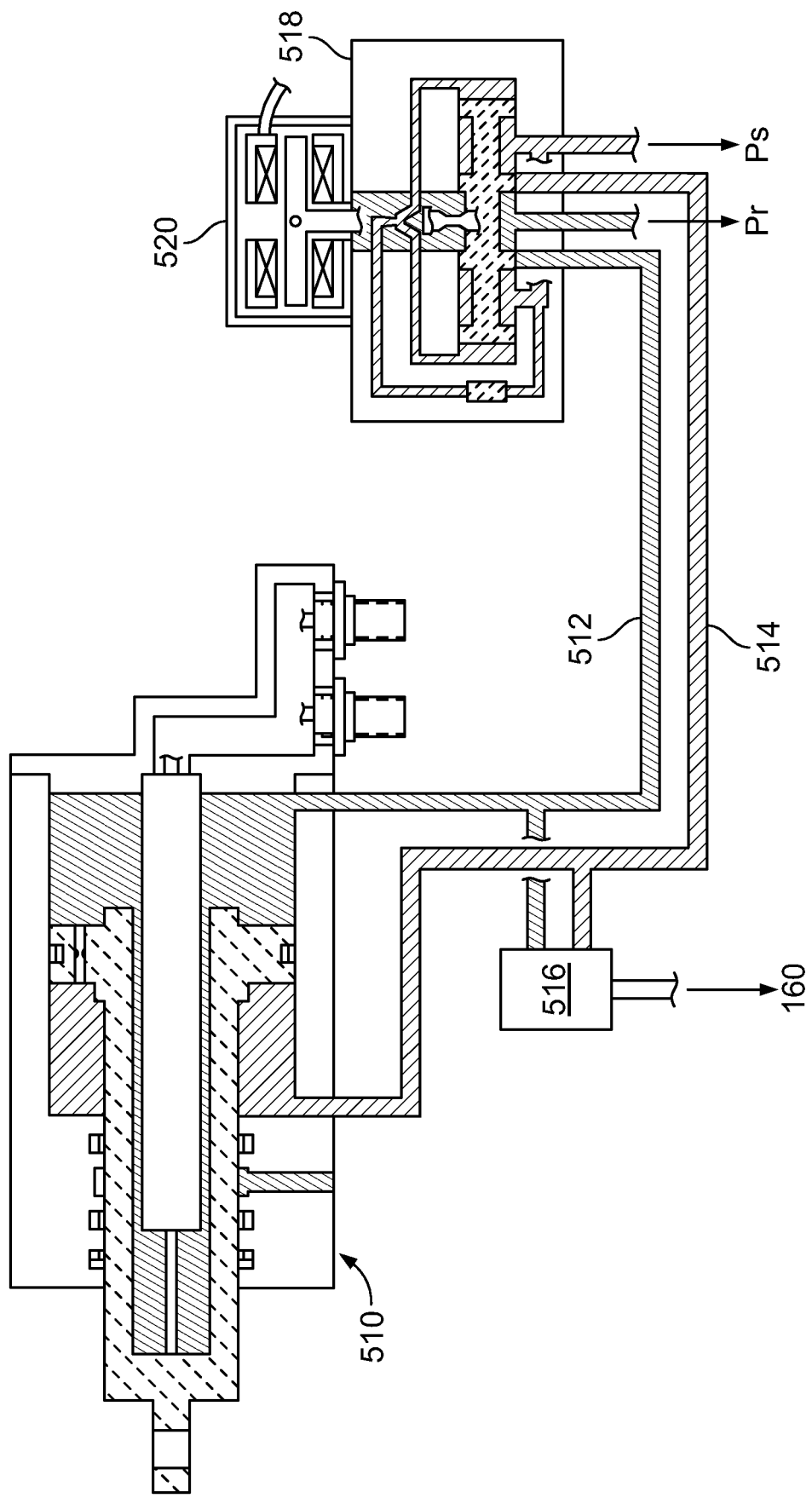
FIG. 5 is a schematic diagram of an exemplary actuation loop in accordance with an exemplary embodiment.

In the example represented in FIG. 1, the fluid pressure supplied to the pump compensator valve 118 from the select high line 160 is limited to the metered flow pressures from the fuel metering units 112. However, the select high line 160 may include fluid communication with additional pressure loads. For example, FIG. 5 represents an actuator loop that includes an actuator 510 that is controlled by a spool valve 518 with an electric controller 520. The spool valve 518 is in fluid communication with a supply pressure (Rs), a return pressure (Pr), a piston head pressure (through a first line 512), and a piston rod pressure (through a second line 514). The controller 520 adjusts the actuator 510 by modifying the fluid pressure in the first line 512 and the second line 514. Both the first line 512 and the second line 514 are in fluid communication with a select high valve 516 which in turn is coupled to the select high line 160. For example, the select high valve 516 may be arranged in a cascaded, in series flow with the select high valves 116 such that the pump compensator valve 118 is provided with a highest of the metered flow pressures, the fluid pressure of the first line 512, and the fluid pressure of the second line 514.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A fluid supply system, comprising:
   a variable displacement piston pump configured to supply a fluid at a pump discharge pressure;
   at least a first fuel metering unit and a second fuel metering unit that are in flow-parallel fuel metering units downstream of the variable displacement piston pump, each of the first and second fuel metering units configured to receive the fluid from the variable displacement piston pump at the pump discharge pressure and supply the fluid at metered flow discharge pressures;
   a pump compensator valve fluidically coupled with the at least said first and second fuel metering units to receive the fluid therefrom at the metered flow discharge pressures and configured to continuously, either fluidically or mechanically, adjust the pump discharge pressure of the variable displacement piston pump between a higher of a minimum pump discharge pressure and a floating ceiling pump discharge pressure, the floating ceiling pump discharge pressure based on a highest of the metered flow discharge pressures;
   a first select high valve downstream from the first fuel metering unit and a second select high valve downstream from the second fuel metering unit, the first select high valve and the second select high valve are upstream of the pump compensator valve and configured to provide the highest of the metered flow discharge pressures of the first fuel metering unit and the second fuel metering unit to the pump compensator valve.

2. The fluid supply system of claim 1, wherein the first select high valve and the second select high valve are toggle valves positioned in flow-series.

3. The fluid supply system of claim 1, wherein the first select high valve and the second select high valve are check valves positioned in flow-parallel.

4. The fluid supply system of claim 1, wherein the minimum pump discharge pressure is a predetermined pressure above a supply pressure of the fluid at which the variable displacement piston pump receives the fluid.

5. The fluid supply system of claim 1, wherein the floating ceiling pump discharge pressure is a predetermined pressure above the highest of the metered flow discharge pressures, wherein the floating ceiling pump discharge pressure varies as the highest of the metered flow discharge pressures varies.

6. The fluid supply system of claim 1, wherein the pump compensator valve is configured to adjust the pump discharge pressure of the variable displacement piston pump based on a fluid pressure of an inlet of the variable displacement piston pump, a fluid pressure of a supply line fluid, and a fluid pressure of the highest of the metered flow discharge pressures.

7. The fluid supply system of claim 1, further comprising one or more actuation loops downstream of the variable displacement piston pump, wherein the pump compensator valve is fluidically coupled with the one or more actuation loops, wherein the floating ceiling pump discharge pressure is based on a highest of the metered flow discharge pressures and one or more additional fluid pressures of the one or more actuation loops.

8. A fluid supply system, comprising:
   a variable displacement piston pump configured to supply a fluid at a pump discharge pressure;
   one or more fuel metering units downstream of the variable displacement piston pump, each of the one or more fuel metering units configured to receive the fluid from the variable displacement piston pump at the pump discharge pressure and supply the fluid at metered flow discharge pressures; and
   a pump compensator valve fluidically coupled with the one or more fuel metering units to receive the fluid therefrom at the metered flow discharge pressures and configured to continuously, either fluidically or mechanically, adjust the pump discharge pressure of the variable displacement piston pump between a higher of a minimum pump discharge pressure and a floating ceiling pump discharge pressure, the floating ceiling pump discharge pressure based on a highest of the metered flow discharge pressures, wherein the pump compensator valve is configured to adjust the pump discharge pressure of the variable displacement piston pump based on a fluid pressure of an inlet of the variable displacement piston pump, a fluid pressure of a supply line fluid, and a fluid pressure of the highest of the metered flow discharge pressures, wherein the pump compensator valve includes a valve body having a first valve element and a second valve element that are each movable with the valve body along a common axis, the first valve element engaging a first valve spring and the second valve element engaging a second valve spring, wherein the first valve element is biased toward the second valve element by the fluid pressure of the supply line fluid and biased away from the second valve element by the first valve spring and the fluid pressure of the inlet of the variable displacement piston pump, wherein the second valve element is biased toward the first valve element by the fluid pressure of the highest of the metered flow discharge pressures and biased away from the first valve element by the fluid pressure of the inlet of the variable displacement piston pump and the second valve spring.

9. A method comprising:
supplying a fluid at a pump discharge pressure with a variable displacement piston pump;
receiving the fluid from the variable displacement piston pump at the pump discharge pressure by a first fuel metering unit and a second fuel metering unit in flow-parallel downstream of the variable displacement piston pump;
providing the fluid at the metered flow discharge pressures of the first fuel metering unit to a first select high valve downstream from the first fuel metering unit and the fluid at the metered flow discharge pressure of the second fuel metering unit to a second select high valve downstream from the second fuel metering unit;
providing a pump compensator valve downstream of the first and second select high valves with the highest of the metered flow discharge pressures of the first fuel metering unit and the second fuel metering unit with the first select high valve or the second select high valve; and
continuously, either fluidically or mechanically, adjusting the pump discharge pressure of the variable displacement piston pump with the pump compensator valve between a higher of a minimum pump discharge pressure and a floating ceiling pump discharge pressure, the floating ceiling pump discharge pressure based on the highest of the metered flow discharge pressures.

10. The method of claim 9, wherein the first select high valve and the second select high valve are toggle valves positioned in flow-series.

11. The method of claim 9, wherein the first select high valve and the second select high valve are check valves positioned in flow-parallel.

12. The method of claim 9, further comprising setting the minimum pump discharge pressure to a predetermined pressure above a supply pressure of the fluid at which the variable displacement piston pump receives the fluid.

13. The method of claim 9, further comprising setting the floating ceiling pump discharge pressure to a predetermined pressure above the highest of the metered flow discharge pressures, wherein the floating ceiling pump discharge pressure varies as the highest of the metered flow discharge pressures varies.

14. The method of claim 9, further comprising adjusting the pump discharge pressure of the variable displacement piston pump with the pump compensator valve based on a fluid pressure of an inlet of the variable displacement piston pump, a fluid pressure of a supply line fluid, and a fluid pressure of the highest of the metered flow discharge pressures.

15. The method of claim 14, wherein the pump compensator valve includes a valve body having a first valve element and a second valve element that are each movable with the valve body along a common axis, the first valve element engaging a first valve spring and the second valve element engaging a second valve spring, the method comprising biasing the first valve element toward the second valve element by the fluid pressure of the supply line fluid and biasing the first valve element away from the second valve element with the first valve spring and the fluid pressure of the inlet of the variable displacement piston pump, biasing the second valve element toward the first valve element by the fluid pressure of the highest of the metered flow discharge pressures and biasing the second valve element away from the first valve element by the fluid pressure of the inlet of the variable displacement piston pump and the second valve spring.

16. The method of claim 9, further comprising:
receiving a highest of the metered flow discharge pressures and one or more additional fluid pressures from one or more actuation loops downstream of the variable displacement piston pump with the pump compensator valve; and
continuously, either fluidically or mechanically, adjusting the pump discharge pressure of the variable displacement piston pump with the pump compensator valve between a higher of the minimum pump discharge pressure and the floating ceiling pump discharge pressure, wherein the floating ceiling pump discharge pressure is based on the highest of the metered flow discharge pressures and the one or more additional fluid pressures of the one or more actuation loops.

* * * * *